Feb. 12, 1957     L. M. WELCH ET AL     2,781,334
DIVINYL AROMATIC MODIFIED ISOOLEFIN-MULTIOLEFIN COPOLYMERS
Filed May 1, 1952
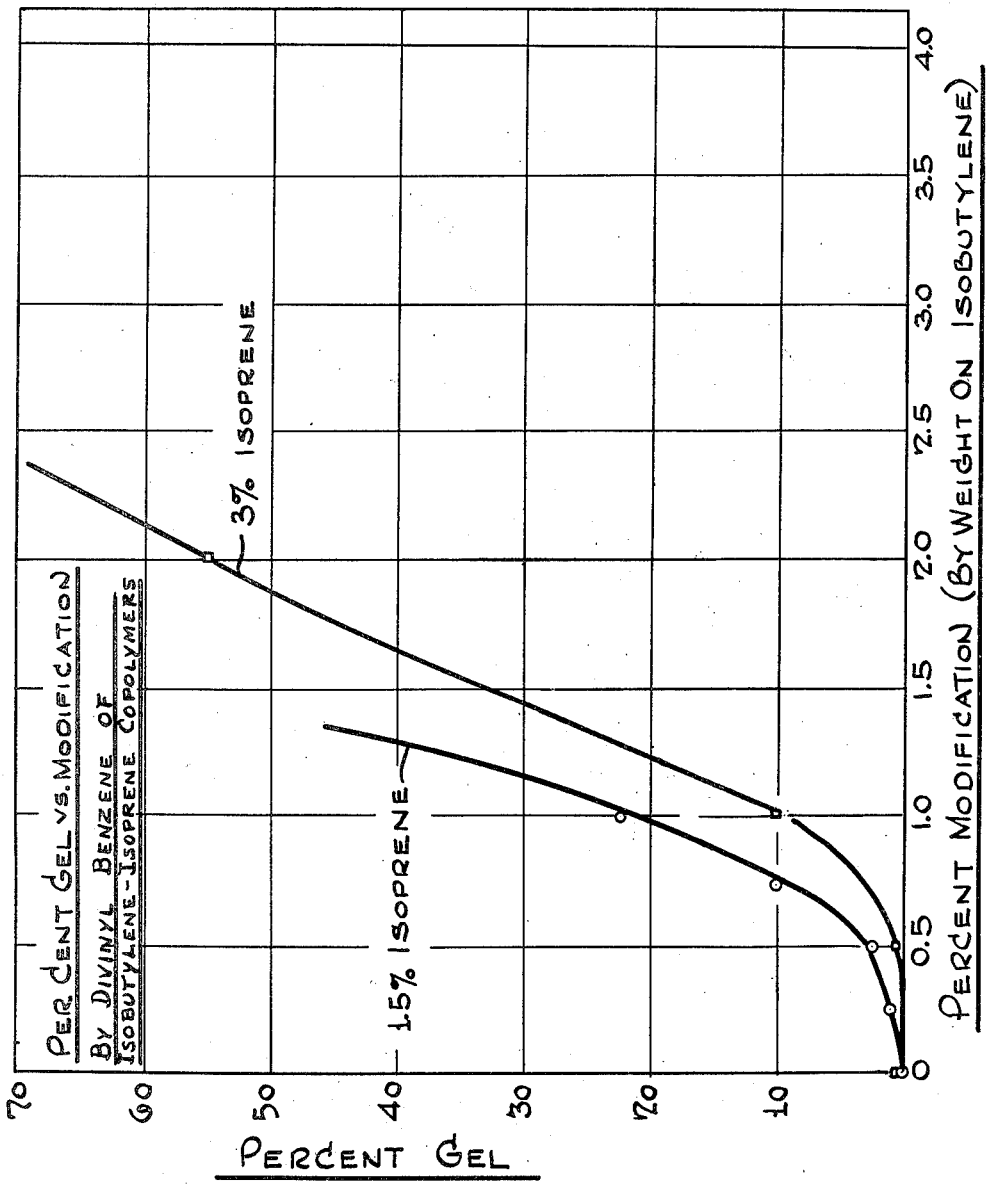
Lester M. Welch
Howard L. Wilson
Luther B. Turner    Inventors
By W. H. Smyers    Attorney

United States Patent Office 2,781,334
Patented Feb. 12, 1957

2,781,334

DIVINYL AROMATIC MODIFIED ISOOLEFIN-MULTIOLEFIN COPOLYMERS

Lester M. Welch, Madison, Howard L. Wilson, Raritan Township, Middlesex County, and Luther B. Turner, Cranford, N. J., assignors to Esso Research and Engineering Company, a corporation of Delaware Application May 1, 1952, Serial No. 285,391

8 Claims. (Cl. 260—80.7)

This invention relates to improved rubbery polymeric materials and relates particularly to vulcanizable interpolymeric materials and means for improving their cold flow characteristics, especially for preparing oil soluble, low gel content copolymers. The invention relates especially to interpolymeric materials containing minor amounts of a cross-linking agent particularly selected from the group consisting of divinyl aromatic hydrocarbon compounds and is a continuation-in-part of application Ser. No. 753,040, filed June 6, 1947, now abandoned.

It has heretofore been found possible to prepare valuable copolymers by polymerizing mixtures of an isoolefin such as, specifically, isobutylene, with conjugated diolefins, for example, butadiene, isoprene, piperylene and dimethyl butadiene and the methyl pentadienes. The presence of the diolefin permits the preparation of a copolymer in which the chemical unsaturation is high enough to permit vulcanization. The copolymers are prepared by a low temperature polymerization using a diluent-refrigerant and a dissolved Friedel-Crafts type catalyst as, for example, aluminum chloride dissolved in an alkyl halide. The resulting interpolymers are elastic, rubberylike substances having Staudinger molecular weights within the range between about 25,000 and about 100,000, and an iodine number within the range between about 1 up to about 50, and are reactive with sulfur particularly in the presence of a sulfurization aid.

The present invention provides a new type of oil soluble, low gel interpolymer, the interpolymerization being carried out between an isoolefin, a conjugated diolefin, and a small amount, 0.1 to 0.8%, preferably more than 0.4%, by weight, of a divinyl aromatic hydrocarbon such as divinyl benzene and its homologues. The resulting interpolymers are also elastic substances having physical characteristics closely similar to, but improved over, the simple interpolymers of isobutylene and conjugated diolefins. The physical properties are particularly improved by a reduction in the cold flow of the raw gum copolymer. In addition, copolymers of the present invention are substantially soluble in organic solvents, including either aliphatic, aromatic or chlorinated solvents and have a relatively low gel content. The modified copolymers are more elastic and can tolerate higher concentrations of plasticizers in the compounding operations.

The well known rubbery interpolymers of iso-monoolefins, such as isobutylene, and conjugated diolefins such as isoprene and butadiene, are marketed commercially under the name "Butyl Rubber" and also under the Government designation: GR–I. This synthetic rubbery material has a sufficient number of physical properties of natural rubber such that it is excellent for certain uses. Polymers of the isoolefin-diolefin type have been found to be particularly suitable for automobile inner tubes because of the resistance of the material to the diffusion of air and other gases when under pressure in which respect they are superior to natural rubber. However, in the manufacture of inner tubes and other types of rubber materials, difficulties have been encountered in the processing steps. In general, the isoolefin-diolefin copolymers extrude and show only moderate swell at the extruder die. After extrusion, the physical properties of the copolymer, namely, the "cold flow" of the rubbery material causes the extruded object to lose its shape if it is allowed to stand for a few hours at room temperature before a final curing. Consequently, the forming steps must necessarily be carried out rapidly and completed without a pause until the article is cured. This requirement is a disadvantage in large scale plant practice and causes a considerable number of rejections of extruded objects due to mechanical failure or deformation of the copolymer compound. The flow of the rubber in the packages and of chunks lying on the shelves, etc. is also a very objectionable problem around factories.

It has now been found that if the polymerization of the iso-monoolefin and the conjugated diolefin is carried out in the presence of very small amounts, of 0.1 to about 0.4 or to a maximum of 0.8% by weight, of the total reactants of a cross-linking agent, for example a divinyl aromatic compound such as divinyl benzene, it is possible to maintain a reasonable extrusion rate and at the same time greatly reduce the tendency of the copolymer toward cold flow. When this improved synthetic rubbery copolymer is employed for the manufacture of formed articles, the tendency toward cold flow upon standing of the uncured object is either completely removed or very greatly reduced. These new modified compositions are readily vulcanizable by well known commercial methods.

To carry out the process of the present invention there is prepared a mixture of the iso-monoolefin, having 4 to 5 carbon atoms, preferably isobutylene in major proportion, a diolefin containing at least two conjugated ethylenic linkages and having from 4 to 8 carbon atoms per molecule in minor proportion, such substances including butadiene, isoprene, piperylene, and dimethyl butadiene, and from 0.1% to no more than 0.4 up to 0.8% by weight based on the isobutylene of a modifying agent consisting of divinylbenzene. The resulting mixture of olefins and diolefins is polymerized at a temperature below 0° C. within the range from 0° C. to −164° C. This polymerization is carried out by application to the cold olefin mixture of a Friedel-Craft catalyst in solution to produce the desired oil soluble copolymer without the presence of substantial quantities of insoluble gel. The copolymer is recovered from the polymerization reactor, by dumping the mixture into water to hydrolyze and remove the residual catalyst, and to drive out the dissolved and adsorbed monomer present from the original reaction mixture. The polymer after drying can then be compounded with appropriate amounts of zinc oxide, carbon black, stearic acid, and other additives, if desired, and a curing agent or agents which may be sulfur and a sulfurization aid, or a non-sulfur curing agent such as p-quinone dioxime, or dinitroso benzene, or their analogues, homologues and/or equivalents. The resulting compounded polymer is then extruded into the desired shape, for instance, a tubular shape, which is put through the subsequent forming, splicing and valve pad applying operations and is then cured under pressure in an appropriate mold in order to yield the desired finished article, particularly an inner tube. Storage of the uncured tubes as is required in normal factory operations does not result in excessive bruising or in the development of thin spots or other difficulties where applicants' improved polymer containing minor amounts of cross-linking agents such as divinylbenzene is used in the polymerization. These modified soluble products are especially useful for making cements and solutions of the copolymers for such purposes as coating compositions. Soluble polymers also give superior processing characteristics.

One raw material is the preferred iso-monoolefin, isobutylene, which is preferably of a purity of at least 96 to 99.5%. Another raw material is a multiolefin containing at least two carbon-to-carbon double linkages, the preferred substance is a conjugated diolefin such as isoprene or butadiene, but other multiolefins having from 4 to 8, inclusive, carbon atoms can be used. The isobutylene and the conjugated diolefin, are mixed together in a proportion which depends somewhat upon the characteristics of the multiolefin. For instance, with butadiene, the reaction mixture which is to be polymerized may contain from 70 to 90 parts of isobutylene with from 30 to 10 parts of butadiene, with isoprene, the preferred range is from 95 to 99.5 parts of isobutylene with from 5 to 0.5 parts of isoprene. It is to be noted that most of the multiolefins copolymerize into the finished copolymer in a proportion approaching that in which they are present in the initial reaction mixture except butadiene. In polymerizing butadiene and isobutylene together, approximately 20% of butadiene present in the mixture causes the copolymerization of only about 1% of the butadiene into the copolymer, and accordingly, there is a change in relative concentrations of butadiene and isobutylene as the batch reaction proceeds. Most of the unsaturates show different polymerization ratios.

For the modifying material, i. e. the third reactant, the preferred substance is a diolefinic hydrocarbon cross-linking agent, including divinyl benzene or an analogous compound, such as alkyl substituted divinyl benzene. The para, the ortho and meta-compounds are all usable, or mixtures of any two or all three. The analagous naphthyl compounds appear to be similarly usable, as are the divinyl toluenes and the divinyl xylenes. Diisopropenyl benzene is also useful. In using these substances, it is of great importance to use percentages of from 0.1 up to about 0.4 or 0.8% by weight based on the isobutylene used. The use of larger amounts of the modifying materials gives amounts of gel in excess of 20–25% in the polymer and yields polymers which are too insoluble when solutions of the polymer are desired in the trade. In any event, higher concentrations may give insoluble polymers which require modified techniques for processing.

The polymerization reaction can be conducted batchwise or in a continuous operation in which continuous streams of cold catalyst and cold unsaturate with a diluent are delivered to the reactor and an overflow of a slurry or solution of polymer is taken out for the recovery of the polymer.

The polymerization reaction is conducted within a temperature range between 0° C. and —164° C., preferably within the range between —40° C. or —50° C. and —110° C. The reduced temperature may be obtained by the direct admixture to the reactant olefins of a refrigerant-diluent such as liquid propane, solid carbon dioxide, liquid ethane or liquid ethylene. For an internal refrigerant it is essential that the refrigerant be free from any tendency to copolymerize and free from any tendency to react with the catalyst. Alternatively, the reduced temperature may be obtained by an external refrigerating jacket upon the reaction vessel. Any convenient refrigerant may be used in the reactor jacket including carbon dioxide, propane, ethane, and ethylene and the like.

In carrying out the polymerization reactions employing cross-linking agents, it is preferred to conduct the reaction in the presence of at least 1 up to 10 volumes of a diluent which may be a refrigerant-diluent or may be a simple diluent such as ethyl or methyl chloride, or methylene or ethylene dichloride, or chloroform, or ethylene trichloride, or a mixed diluent containing a hydrocarbon such as propane, butane or the like. In any event, it is preferred to employ a reaction diluent containing more than 50% by volume of an alkyl halide having from 1 to 2 carbon atoms, the preferred halogenated diluents being methyl chloride or ethyl chloride. The principal requirements for the diluent are that it shall be liquid at the reaction temperature, that it shall be not reactive with the catalyst and that it shall be sufficiently stable under the reaction conditions to avoid the production of break-down products. Various of the chloro-fluoro hydro-carbons as well as fluoro hydrocarbons or other inert diluents which are quite soluble in the reaction mixture can be used.

The polymerization catalyst employed is a Friedel-Crafts active metal halide catalyst substance in solution in a low-freezing, non-complex-forming solvent. Aluminum chloride is usually the preferred catalytic substance with aluminum bromide and titanium tetrachloride just about as satisfactory. Boron trifluoride in solution is satisfactorily usable with some of the diolefins. For the catalyst solvent, it is only necessary that the solvent have a freezing point below 0° C., although it is usually convenient to use a catalyst solvent having a freezing point below the polymerization temperature. These requirements are met by any solvent which is low freezing, that is, having a freezing point below the freezing point of water. The preferred catalyst solvents with aluminum chloride are ethyl and methyl chloride or methylene or ethylene dichloride, or chloroform, or occasionally, propyl chloride or the like. With aluminum bromide or boron trifluoride as catalyst, the same solvents are advantageously useable and, in addition, the low-freezing hydrocarbons such as liquid ethane, liquid butane, liquid heptane, liquid hexane and the like are also usable.

The soluble, modified copolymer products so produced show reduced cold flow, increased plasticizer tolerance, and much improved characteristics during handling and fabrication.

It is to be especially noted as outstanding and surprising that, in minor amount of about 0.1 to about 0.4 or 0.8%, cross-linking agents, such as divinyl benzene function as modifiers for copolymers of isobutylene and conjugated diolefin, particularly isoprene. This is shown by the curves of the accompanying figure in which the percent of gel, which parallels the solubility of the copolymer, is plotted against the percent modification. It is to be noted that above a value of about 0.4 to 0.8% of modifier, the properties of these materials are markedly different than when used in lower concentration. These differences are particularly well shown in polymerizations employing alkyl halides as diluents and using at least one volume of diluent per volume of mixed reactants. The data from which the curves of the figures are drawn are described in greater detail in Example 7.

The production of soluble or insoluble polymers containing more or less quantities of gel by the use of a bifunctional agent such as divinyl benzene is considerably influenced by certain other factors. The most important factor other than the amount of cross-linking agent is the average chain length of the polymer produced. This chain length can be affected by changing the ratio of diluent. For instance, if there is 10 parts of diluent per part of isobutylene reactant, the chain length will be substantially shorter than if 2 parts of diluent per part of isobutylene reactant are used. Similarly, the chain length may be shortened by use of poisons such as butene-1, propylene, etc. which do not enter substantially into the polymerization. A third method of shortening chain length is accomplished by polymerizing the olefinic mixture to high conversion. The reduction in chain length by the use of each of these methods or any combination thereof will tend to reduce the gel formation resulting from the combined effect of the chain length and the cross-linking agent. Increasing the ratio of the conjugated multiolefin to that of isobutylene will also tend to reduce gel formation as is shown in the accompanying figure. In the laboratory, particularly with batch polymerizations, it is preferable to use the "poison" method of control because large quantities of diluent reduce the quantity of polymer produced per run. However, in continuous operation, molecular weight control is best obtained by the use of diluent and by control of the conversion. In either case, the method of molecular weight control is not important to the final results in determining the effect of the amount of cross-linking agent.

In measuring the cold flow properties of a plastic polymer, a portion of the raw polymer free from any compounding agents, sufficient in amount to make a cylindrical pellet ¾" in diameter and ½" in height is placed in a cylindrical mould and held for 40 minutes at a temperature of 287° F. under sufficient pressure to produce a homogeneous, well-shaped pellet. The pellet is then removed from the mould, measured for heights; and placed on a flat plate in an air oven held at 40° C. A weight of 1.8 kilograms is then placed on the pellet and allowed to remain for three minutes. At the end of the three minutes, the weight is removed and the pellet is placed in boiling water for 15 minutes to allow complete recovery of the lastic component of the deformation. The pellet is then accurately measured for its final height. The "cold flow" or "permanent deformation" is then calculated from the following equation:

$$\text{Cold flow } (\%/\text{sec.}) = \frac{\text{original height minus final height}}{\text{original height} \times \text{time (secs.)}} \times 100$$

It will be noted that this procedure measures the change in height due to flow at 40° C. and avoids any question of elastic deformation which may not be rapidly recovered. It is found that this measurement method is an excellent means for determining the resistance of the polymer to plastic flow and to change of shape during standing at room temperature in plant processing.

In the data shown below, the polymers modified with divinyl benzene show lower cold flow than the corresponding Mooney control polymer. The modified polymers have higher recovery values (are more elastic) than the control polymer.

It is found that the polymers prepared as outlined above, tend to show a slight reduction in extrusion rate, which, however, is too small to be significant. In measuring the extrusion rate, a small or laboratory type extruder consisting of a power-driven worm operating within a corrugated casing with a die at the outlet end is used, and the rate in inches per minute at which the polymer can be forced through the die without the production of irregular or erratic product is measured. The extruder usually has a steam-jacketed barrel and the extrusion may be conducted at temperatures ranging from 200° F. to 280° F., the preferred temperature being 237° F. The number of inches of tube which can be extruded in one minute is then measured and this measurement is an excellent indication of the rate at which the polymer can be extruded in plant practice. The extrusion properties are sufficiently good up to about 0.8% concentration of DVB in the polymer.

The amount of "swell" is determined by measurement of the gram weight per inch of a tube extruded through a standard die. The standard die has an 0.4" diameter opening and an 0.3" diameter core so as to give an extruded tube of 0.4" outside diameter and an 0.3" inside diameter and a value of 1.03 grams per inch if no "swell" occurred. The weight of 1" of the tube extended from this die is the "swell." Both the extrusion rate decreases and the amount of swell increases, although the polymers are quite acceptable until the DVB concentration is increased to about 0.8%. At about 1% concentration, a rough surface is formed.

In the examples shown below, all parts and percentages are by weight unless otherwise indicated.

EXAMPLE 1

A series of batch polymerizations were conducted in which the first batch contained 97 parts of isobutylene of approximately 98.5% purity with 3 parts of isoprene of approximately 96% purity. This batch was cooled by a liquid ethylene cooling jacket to approximately −103° C. (the temperature tends to range between −95° C. and −102° C.) and there was added to the mixture approximately 3 volumes of methyl chloride. When the mixture had been fully cooled to the desired temperature, it was polymerized by the addition of approximately 150 parts of an 0.2% solution of aluminum chloride in methyl chloride; this amount being sufficient to cause the polymerization of approximately 54% of the unsaturates present, as shown in the following Table I. Simultaneously, an additional batch was prepared containing 0.4% divinyl benzene. This was similarly polymerized as shown in Table I. After the polymerization step, the polymerized mixture was discharged into warm water to volatilize out the methyl chloride and the unpolymerized unsaturates and the polymer was then brought up to room temperature, dried, compounded and then extruded in the standard extruder to determine the permissible extrusion rate and swell. Simultaneously, measurements of cold flow were made as above outlined. At the same time other portions of the polymer were compounded according to the following recipe:

| | Parts |
|---|---|
| Polymer | 100 |
| Zinc oxide | 5 |
| Sulfur | 2 |
| Carbon black (channel black) | 50 |
| Tuads (tetramethylthiuram disulfide) | 1 |
| Captax (2-mercapto-benzothiazole) | 0.5 |

Portions of the three batches of polymers so compounded were cured in the press for 20 and 40 minutes and determinations were then made in tensile strength, elongation at break and modulus at 300% extension, as shown in Table I:

*Table I*

EFFECT OF DIVINYL BENZENE IN THE COPOLYMER

| Run No. | Feed—97% isobutylene, 3% isoprene | Percent conv. | M.W.×10⁻³ | Cold flow, percent/sec.[1] (1.8 kg. at 40° C.) | Rate, in./min. | Swell, g./in. | Cure at 307° F. 50 pts. channel black | | | | | |
|---|---|---|---|---|---|---|---|---|---|---|---|---|
| | | | | | | | Tensiles | | Elong. | | Mod. 300% | |
| | | | | | | | 20' | 40' | 20' | 40' | 20' | 40' |
| 1 | Feed, control | 54 | 50 | 0.016 | 56 | 1.65 | 2,120 | 1,900 | 830 | 680 | 320 | 500 |
| 2 | Feed + 0.4 DVB | 54 | 58 | 0.001 | 55 | 1.69 | 2,000 | 1,850 | 850 | 680 | 280 | 370 |

[1] Pure gum.

In the above table, the divinyl benzene was added in the form of a solution containing approximately 40% of the divinyl benzene itself, the remaining 60% being mostly ethyl vinyl benzene and di-ethyl benzene. The amount of divinyl benzene shown in the table is that actually added, not the amount of the mixed solution added.

These results show the very great reduction in cold flow of the polymer which is found to be sufficient to reduce the inspection loss from bruising and similar damage in normal tube factory processing operations. The changes in the cured physical properties of the cured polymer were not very great, both being acceptable.

EXAMPLE 2

A similar series of polymerizations were conducted in a continuous polymerizer using varying amounts of divinyl benzene in a polymerization mixture consisting of 97.5 parts of isobutylene (99% purity) with 2.5 parts of isoprene (96% purity). Similar gains in cold flow were realized in the continuous polymerizer at the cost of similar small sacrifices in other physical properties in a manner analogous to that shown in Example 1. These results are well shown in the following Table II.

conditions by the addition of small amounts of divinyl benzene and show the negligible change in other physical properties, particularly after curing.

EXAMPLE 3

Copolymer produced, as shown in Example 2, was then put through the commercial procedure for the production of inner tubes and a comparison was made between the results obtained and the results previously obtained from similar polymer containing no divinyl benzene. This comparison showed a very substantial reduction in fold breakdown of extruded tubes as a result of the low cold flow of the polymer; it being found that extruded tubes could be left in trays sufficient time for normal processing without the troublesome deformation characteristic of prior samples of polymer. Also, it was found that up to 10% of hydrocarbon plasticizer could be added to ease and speed up the extrusion and reduce the swell, without introducing such an amount of cold flow as to interfere with the handling of the extruded tubes in normal factory procedure.

EXAMPLE 4

It is also found that a very advantageous blend can be prepared consisting in part of polymer according to the

*Table II*

CONTINUOUS POLYMERIZATION OF ISOBUTYLENE-ISOPRENE FEEDS CONTAINING DIVINYL BENZENE
(D. V. B.)

| Run No. | Feed—parts by weight based on isobutylene | Percent conv. | Staud. M. W. | Mooney viscosity, 1½-8′ | Pure gum flow, percent/sec. at 40° C. | Extrusion (b) | | 8′ Tube stock cures at 320° F. (b) | | | |
|---|---|---|---|---|---|---|---|---|---|---|---|
| | | | | | | Rate, in./min. | Swell, g./in. | Tensile, #/sq. in. | Elong., percent | Moduli at— | |
| | | | | | | | | | | 300% | 400% |
| 1 (control) | 100 isobutylene<br>2.5 isoprene<br>308 methyl chloride | 70 | | 51–45 | .05 to .08 | 55 | 2.00 | 1,900 | 750 | 370 | |
| 2 | 100 isobutylene<br>2.5 isoprene<br>308 methyl chloride<br>0.4 D. V. B.<br>5 butene-1 | 69 | 30,000 | 40–34 | 0 | 44 | 2.45 | 1,860 | 800 | 400 | 650 |
| 3 | 100 isobutylene<br>2.5 isoprene<br>308 methyl chloride<br>0.4 D. V. B.<br>2 butene-1 | 63 | 32,000 | 40–34 | .017 | 45.5 | 2.79 | 1,610 | 640 | 480 | 740 |
| 4 | | 40 | 33,800 | 45–39 | .020 | 54.3 | 2.52 | 1,790 | 720 | 350 | 620 |
| 5 | 100 isobutylene<br>2.5 isoprene<br>308 methyl chloride<br>0.2 D. V. B.<br>1 butene-1 | 66 | | 62–54 | 0 | 60.1 | 2.24 | 2,130 | 740 | 410 | 670 |
| 6 | | 48 | | 68–58 | 0 | 56.4 | 2.25 | 2,000 | 730 | 390 | 650 |

For the cured sample tests, the several samples of polymer were compounded according to the following recipe:

| | Parts |
|---|---|
| Polymer | 100 |
| Furnace black | 50 |
| Zinc oxide | 5 |
| Sulfur | 2 |
| Tuads | 1 |
| Captax | 0.5 |

These results show the very great gain in cold flow properties obtainable under continuous polymerization present invention and polymer according to the prior art; (that is, the low temperature copolymer of isobutylene with a diolefin prepared in the absence of a divinyl benzene), since it is found that a polymer having zero cold flow prepared according to the present invention can be compounded with a polymer of the prior art characterized by the usual high cold flow of the prior art, to yield a polymer which is intermediate, yet has a good extrusion rate and a good swell. The preferred percentage of mixing is approximately equal parts, but advantageous properties are obtainable by mixtures containing as little as 20% or more of either component with 80% or less of the other component. These results are well shown in the Table III.

Table III
BLENDS OF 0.4% DIVINYL BENZENE MODIFIED COPOLYMER (b)

| Polymer number | D. V. B. polymer | Percent prior art plain polymer | Pure gum cold flow at 40° C., percent/sec. | Extrusion (a) | | 8' tube stock cure at 320° F. (a) | | | |
|---|---|---|---|---|---|---|---|---|---|
| | | | | Rate | Swell | Tensile, lbs./sq. in. | Elongation, percent | Modulus 300% | 400% |
| 1 | 100 | 0 | 0.0088 | 44.5 | 2.38 | 1,790 | 810 | 390 | 650 |
| 2 | 75 | 25 | 0.0165 | 53.5 | 2.16 | 1,980 | 820 | 370 | 670 |
| 3 | 50 | 50 | 0.0256 | 58.0 | 2.08 | 1,500 | 710 | 440 | 640 |
| 4 | 25 | 75 | 0.0408 | 63.5 | 1.97 | 1,720 | 750 | 460 | 750 |
| 5 | 0 | 100 | 0.0653 | 68.5 | 1.92 | 1,980 | 800 | 330 | 570 | a 50 part Gastex carbon black recipe:

Polymer _____ 100
Gastex _____ 50
Zinc oxide _____ 5
Sulfur _____ 2
Tuads _____ 1
Captax _____ 0.5 b Polymer was prepared from a feed consisting of 97.5 parts isobutylene with 2.5 parts isoprene diluted with 2 volumes of methyl chloride which contained 0.4% of divinyl benzene based on the isobutylene.

From Table III it will be evident that neither the tensile strength, the elongation, nor the modulus are greatly modified by the mixture of the two components from either component alone, yet the cold flow is very materially improved.

EXAMPLE 5

Another series of polymerizations using divinyl benzene in the feed is shown in Table IV. These continuous polymerizations using 3.5 parts of isoprene per 100 parts of isobutylene in the feed, show that increasing the concentration of the divinyl benzene cross-linking agent effects a marked improvement in cold flow properties as visually observed by hanging strips of green stock over bars in a similar manner to the storage of green polymer tubes prior to curing.

These polymerization reactions had a high diluent concentration under steady state conditions of operation and no appreciable concentration of butene-1 (poison) was necessary to control the molecular weight.

All the polymerizations were conducted in a 3.5 liter continuous reactor having 1.25 sq. ft. of heat transfer surface and externally cooled by ethylene refrigeration. The basic feed mixture in each case was as follows (parts by weight):

Isobutylene _____ 100
Isoprene _____ 3.5
Methyl chloride _____ 308

The indicated reaction mixtures were polymerized at about −103° C. by the addition of a catalyst solution consisting of 0.18 g. of aluminum chloride per 100 cc. of methyl chloride to the indicated conversions.

EXAMPLE 6

Another series of polymerizations were carried out in which isobutylene is copolymerized with isoprene by cooling the mixture by a liquid ethylene cooling jacket to approximately −102° C. (the temperature tending to range between −95° C. and −102° C.), and using two volumes of methyl chloride as diluent, and using as catalyst approximately 150 parts, based on 100 parts of reactants, of a 0.23 weight percent solution of aluminum chloride in methyl chloride, as catalyst. The polymerization reaction mixture contained about 5% isoprene based on the amount of isobutylene use. In each run, varying amounts of divinyl benzene were employed, and the properties of the resulting polymers and vulcanizates were studied and compared. The data obtained in those comparative measurements are shown below in Table V. The polymers were compounded according to the following recipe, there being employed sufficient dioctyl sebacate as plasticizer to obtain a plastic rubber product having low temperature flexibility.

| | Parts |
|---|---|
| Polymer | 100 |
| Zinc oxide | 5 |
| Philblack (thermal carbon black) | 15 |
| Thermax (thermal carbon black) | 35 |
| Sulfur | 1.5 |
| Tellurac (tellurium diethyl dithio carbamate) | 1.5 |
| Dioctyl sebacate | 25 |

Table IV
EFFECT OF DIVINYL BENZENE CONCENTRATION IN CONTINUOUS PREPARATION OF POLYMER

| Run No. | Modified feed | | Run length, hrs. | Percent conv. based on isobutylene | Staudinger mol. wt. | Mooney viscosity 1½'-8' | Mole percent I₂-Hg (OAC)₂ | Visual observation of cold flow |
|---|---|---|---|---|---|---|---|---|
| | Parts DVB | Parts butene-1 | | | | | | |
| AW-120 | 0.0 | 0 | 3.0 | 50.3 | 31,600 | 36-33 | 1.56 | Poor. |
| AW-121 | 0.1 | 0 | 2.8 | 41.4 | 36,600 | 50-44 | 1.67 | Fair. |
| AW-122 | 0.2 | 0 | 2.0 | 50.3 | 33,800 | 43-40 | 1.56 | Do. |
| AW-123 | 0.3 | 0.5 | 3.5 | 53.9 | 38,000 | 59-51 | 1.71 | Good. |
| AW-119 | 0.4 | 1.0 | 3.5 | 54.0 | 35,800 | 56-49 | 1.53 | Do. |
| AW-126 | 0.6 | 0 | 3.2 | 42.3 | 35,000 | 48-40 | 1.74 | Do. |
| AW-131 | 0.8 | 0 | 3.8 | 50.5 | 39,000 | 50-57 | 1.56 | Excellent. |

Table V

EFFECTS OF DIVINYL BENZENE AS MODIFYING AGENT

| Run No. | Modifier | | Mole percent unsaturation (iodine No.) | Vulcanizates—30' at 320° F. | | Elongation | Percent volume increase |
|---|---|---|---|---|---|---|---|
| | Percent | Type | | Modulus 200-300% | Tensile | | |
| 14 | | | 2.15 | 350-550 | 1,280 | 590 | 370 |
| 15 | 0.5 | Divinyl benzene | 2.66 | 400-650 | 1,010 | 440 | 370 |
| 16 | 1.0 | do | Partially insoluble [1] | 400-760 | 940 | 370 | 380 |
| 17 | 1.5 | do | do | | | | |

[1] Too insoluble to get a satisfactory measure of unsaturation.

The above data of Table V and previous tables indicate that above a maximum of about 0.8% of modifier, the modified rubbers are quite different, since the divinyl benzene gives an insoluble rubber.

EXAMPLE 7

This example shows, in Table VI, the data used to plot the curves of the accompanying figure. The modified polymers were prepared in a 6" baffleless batch reactor using external ethylene refrigeration. The feed mixture was diluted 2 to 1 by volume with methyl chloride. The polymerizations were carried out by adding a catalyst mixture of about 0.2 g. aluminum chloride per 100 cc. of methyl chloride.

Table VI

MODIFIED RAW POLYMER PROPERTIES

| Run No. | Feed designation [1] | Modification—Divinyl benzene, percent | Percent conv. | Percent gel hot milled polymer |
|---|---|---|---|---|
| 793-113-1 | B-1.5 | 0 | 66.1 | 0.6 |
| 793-113-2 | B-1.5 | 0.25 | 67.6 | 0.95 |
| 793-113-3A | B-1.5 | 0.50 | 51.5 | 3.44 |
| 793-113-4A | B-1.5 | 0.75 | 66.1 | 9.75 |
| 793-113-5 | B-1.5 | 1.00 | 81.5 | 22.0 |
| 793-114-1 | B-3 | 0 | 71.0 | 0 |
| 793-114-2 | B-3 | 0.25 | 58.8 | 0 |
| 793-114-3 | B-3 | 0.50 | 77.8 | 0.25 |
| 793-114-4 | B-3 | 0.75 | 69.2 | 2.44 |
| 793-114-5 | B-3 | 1.00 | 75.5 | 9.48 |
| 477-102-6 | B-3 | 2.00 | 69 | 55.8 |

[1] B-1.5=1.5% isoprene in feed; B-3=3.0% isoprene in feed.

What is claimed is:

1. The process of copolymerizing to a hydrocarbon soluble polymer 95 to 99.5% by weight of an iso-olefin having 4 to 5 carbon atoms together with 0.5 to 30% by weight of a conjugated aliphatic diolefin of 4 to 8 carbon atoms, and from 0.1 to about 0.8% by weight based on the iso-olefin used of divinyl benzene, at a temperature between 0° C. and —164° C., by the addition of a dissolved Friedel-Crafts catalyst.

2. The process of copolymerizing to a hydrocarbon soluble polymer 95 to 99.5% by weight of isobutylene with 0.5 to 30% by weight of a conjugated aliphatic diolefin of 4 to 6 carbon atoms, and 0.1 to 0.4% by weight based on the isobutylene used of divinyl benzene, at a temperature between 0° C. and —164° C. by the addition of a Friedel-Crafts catalyst dissolved in an alkyl halide.

3. The process of copolymerizing to a hydrocarbon soluble polymer 95 to 99.5% by weight of isobutylene together with 0.5 to 5.0% of isoprene, and from 0.1 to 0.4% by weight of divinyl benzene based on the isobutylene used, at a temperature between —40° C. and —164° C., in the presence of a dissolved aluminum chloride catalyst and in the presence of at least one volume per volume of mixed olefin reactants of a diluent consisting of a haloalkane having from 1 to 2 carbon atoms.

4. The process of copolymerizing to a hydrocarbon soluble polymer about 97% by weight of isobutylene together with about 3% by weight of isoprene, and about 0.4% by weight based on the isobutylene used of divinyl benzene at a temperature of approximately —102° C. with a catalyst solution comprising aluminum chloride dissolved in methyl chloride in the presence of about 3 volumes of methyl chloride.

5. The process comprising copolymerizing to a hydrocarbon soluble polymer about 97.5% by weight of isobutylene together with about 2.5% by weight of isoprene, and about 0.2% by weight based on the isobutylene used of divinyl benzene at a temperature of approximately —102° C. with a catalyst solution comprising aluminum chloride dissolved in methyl chloride in the presence of about 3 volumes of methyl chloride.

6. A rubbery product consisting essentially of a hydrocarbon soluble copolymer of 95 to 99.5% by weight of an iso-olefin having 4 to 5 carbon atoms, 0.5 to 30% by weight of a conjugated aliphatic diolefin of 4 to 8 carbon atoms, and 0.1 to 0.8% by weight based on the amount of iso-olefin of a divinyl aromatic hydrocarbon having the vinyl groups attached directly to the aromatic nucleus, said copolymer having a Staudinger molecular weight of 25,000 to 100,000, an iodine number of 1 to 50, and reactivity with sulfur to yield an elastic product having reduced cold flow.

7. A rubbery product consisting essentially of a hydrocarbon soluble copolymer of 95 to 99.5% by weight of isobutylene, 0.5 to 30% by weight of a conjugated aliphatic diolefin of 4 to 6 carbon atoms, and 0.1 to 0.4% by weight based on the amount of isobutylene of divinyl benzene, said copolymer having a Staudinger molecular weight of 25,000 to 100,000, an iodine number of 1 to 50, and reactivity with sulfur to yield an elastic product having reduced cold flow.

8. A rubbery product according to claim 7 in which the copolymer comprises 2.5 to 3.5% of isoprene as the conjugated aliphatic diolefin, and 0.2 to 0.4% by weight of divinyl benzene, based on the amount of isobutylene.

References Cited in the file of this patent

UNITED STATES PATENTS

| 2,213,423 | Wiezevich | Sept. 3, 1940 |
| 2,322,073 | Thomas et al. | June 15, 1943 |
| 2,474,807 | Schoene | July 5, 1949 |

FOREIGN PATENTS

| 479,478 | Great Britain | Feb. 7, 1938 |
| 642,050 | Great Britain | Aug. 23, 1950 |
| 964,599 | France | Feb. 1, 1950 |
| 815,844 | Germany | Oct. 4, 1951 |

OTHER REFERENCES

Barron: "Modern Plastics," pages 78, 80, 90, 91, published 1945, Wiley and Son, N. Y.